United States Patent
Ziegler (12)

(10) Patent No.: US 6,711,151 B1
(45) Date of Patent: Mar. 23, 2004

(54) APPARATUS AND METHOD USING PAGING FOR SYNCHRONIZING TO A COMMUNICATION NETWORK WITHOUT JOINING THE NETWORK

(75) Inventor: Kevin Ziegler, Campbell, CA (US)

(73) Assignee: Computer Access Technology Corporation, Santa Clara, CA (US)

( * ) Notice: Subject to any disclaimer, the term of this patent is extended or adjusted under 35 U.S.C. 154(b) by 763 days.

(21) Appl. No.: 09/686,149

(22) Filed: Oct. 10, 2000

(51) Int. Cl.[7] .................................................. H04J 3/06
(52) U.S. Cl. ........................ 370/350; 370/503; 375/354
(58) Field of Search ................................ 370/350, 503, 370/337; 375/354, 356, 359, 133, 134, 136

(56) References Cited

U.S. PATENT DOCUMENTS 5,430,775 A * 7/1995 Fulghum et al. ............ 375/134
5,712,867 A * 1/1998 Yokev et al. ................ 375/136
6,574,266 B1 * 6/2003 Haartsen ..................... 375/133
6,590,928 B1 * 7/2003 Haartsen ..................... 375/134

* cited by examiner

*Primary Examiner*—Chau Nguyen
*Assistant Examiner*—A. W. Wahba
(74) *Attorney, Agent, or Firm*—David R. Gildea (57) ABSTRACT

A method and apparatus for synchronizing with communication traffic in a network without joining the network. The method and apparatus synchronize to the communication traffic by mimicking a BLUETOOTH slave device in order to obtain a preliminary or unconnected system clock time in a master page frequency hop synchronization (FHS) packet from a BLUETOOTH master device when the master device is not connected to any BLUETOOTH slave devices, and then updating the preliminary system clock time with a time-of-arrival of a communication traffic packet from the master device after a connection is formed between the master device and a BLUETOOTH slave device.

20 Claims, 8 Drawing Sheets

| Master TX | Slave TX | Master TX | Master TX | Slave TX | Master TX | Slave TX |
|---|---|---|---|---|---|---|
| 79 | 03 | 06 | 18 | 02 | 17 | 61 |

| ALLOWANCE FOR CLOCK DRIFT IN us | CHANNEL ADVANCE NUMBERS | SEQUENCE OF MASTER CHANNELS | SCAN WINDOW TIME PERIOD OF TIME SLOTS |
|---|---|---|---|
| 625 | 2 | M1,M2,M3,M4... | 2 |
| 937.5 | 4 | M2,M4,M6,M8... | 4 |
| 2187.5 | 8 | M4,M8,M12,M16... | 8 |
| 4687.5 | 16 | M8,M16,M24,M32... | 16 |

APPARATUS AND METHOD USING PAGING FOR SYNCHRONIZING TO A COMMUNICATION NETWORK WITHOUT JOINING THE NETWORK

BACKGROUND OF THE INVENTION

1. Field of the Invention

The invention relates generally to network synchronization and more particularly to a method and apparatus using an unconnected page and a later instance of communication traffic for synchronizing with a communication network without joining the network.

2. Description of the Prior Art

Many system standards have been developed for communication. One such system standard is known as BLUETOOTH. BLUETOOTH is a short range radio system operating in the unlicensed 2.4 GHz Industrial Scientific Medical (ISM) band using frequency hopping spread spectrum signals. The spread spectrum signals enable the system to minimize fading and reduce interference between users. The BLUETOOTH spread spectrum is designed to meet parts 15 and 18 of the Federal Communications Commission (FCC) regulations in the United States and the regulations of other regulatory agencies in other countries. The BLUETOOTH signal uses seventy-nine or twenty-three frequency hopping channels depending upon the country of operation. At any one instant of time, the signal is transmitted in a single one of the channels. Each channel has a bandwidth of one megahertz. The channels succeed each other in a pseudo-random channel hopping sequence specified by a BLUETOOTH system standard. Each successive frequency channel corresponds to a phase or time slot of the pseudo-random sequence.

A BLUETOOTH system network known as a piconet includes a single master device and up to seven active slave devices. The network topology is referred to as a star because all communication involves the master device. Slave to slave communication is not allowed. Another BLUETOOTH network, known as a private network, uses only a single master device and a single active slave device. Typically, the private master and slave devices work with a limited subset of the BLUETOOTH protocol and are provided by a manufacturer as a set.

Figure 1A:
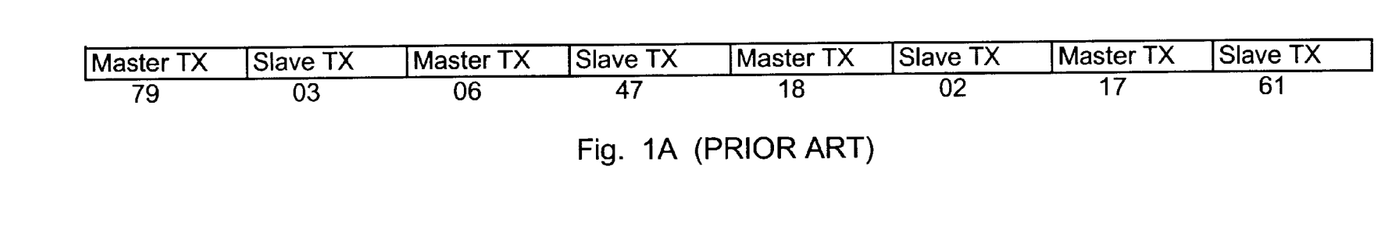
FIGS. 1A and 1B are a time line for communication traffic in a BLUETOOTH network of the prior art and a simplified block diagram of a BLUETOOTH device of the prior art, respectively.

FIG. 1A shows a time line of communication traffic exchange in a BLUETOOTH network. Packets of information are exchanged between the master device and a selected slave device using time division duplex (TDD) with alternating master (master TX) and slave (slave TX) transmissions. Communication traffic is partitioned into time slots 625 microseconds in length for each frequency channel. Every other time slot is considered to be a master time slot. In the master time slot, the master device can transmit a master data packet addressed to a particular slave device. In the following time slot, the addressed slave device may respond to the master data packet by transmitting a slave data packet back to the master device. Transmissions in successive time slots occur on sequential frequency channels in a pseudo-random sequence shown in FIG. 1A in an exemplary manner as channels 79, 03, 06, 47, 18, 02, 17, and 61. The frequency channels are mapped to specific ISM band frequencies by adding a constant offset frequency that is specific to a region. In the United States and most of Europe the offset is 2402 megahertz.

Figure 1B:
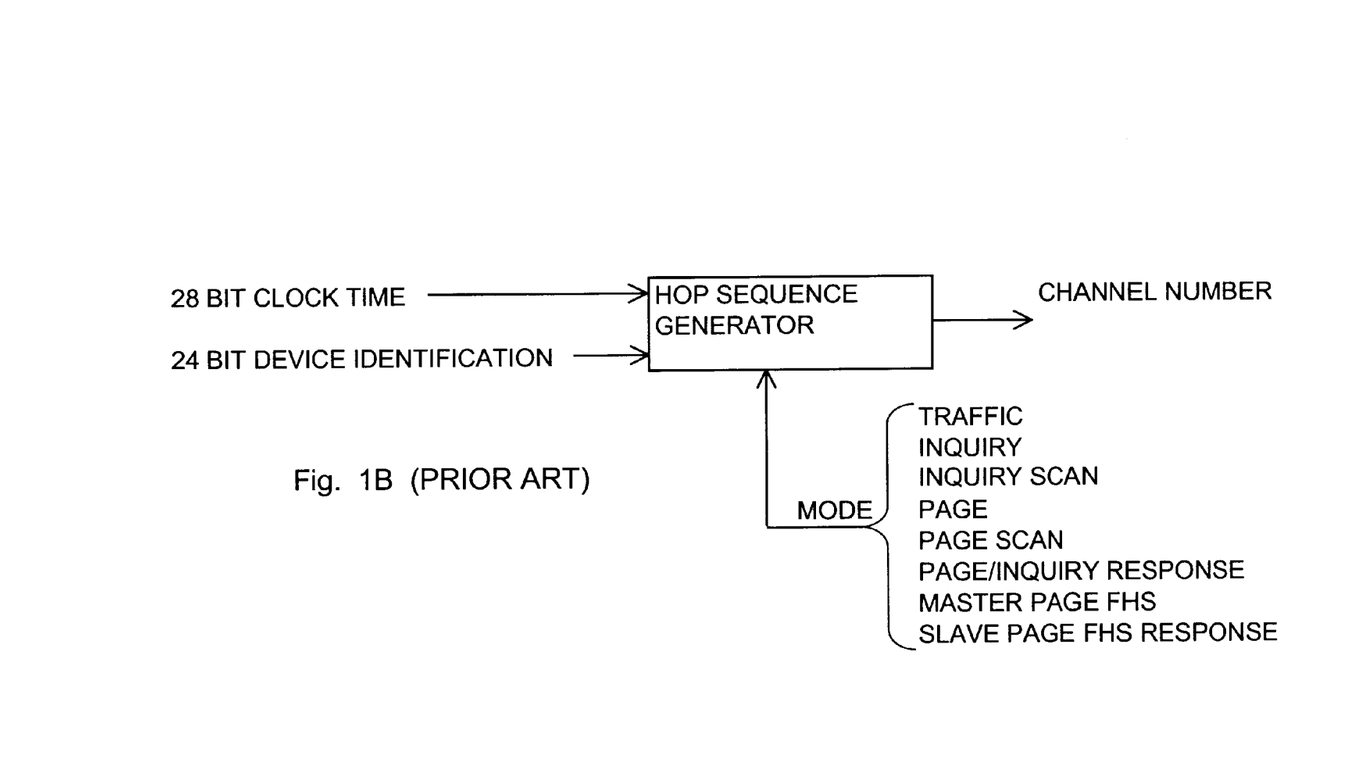

FIG. 1B shows a simplified block diagram for a BLUETOOTH device having a hop sequence generator. Both the master and the slave devices compute the successive channels from a BLUETOOTH system clock time maintained in the master device and the address identification of the master device. In order to follow the frequency hopping sequence of a particular piconet, a slave device must know both the master address and the precise system clock time. The hop sequence generators in the master and slave devices compute the frequency channels for the communication traffic from 24 bits of a 48-bit IEEE address of the master device and a 28-bit system clock time. In addition the timing of the frequency hops is based upon the system clock time. The master clock is a free running counter that increments each 312.5 microseconds (3200 Hz) or one-half of a time slot. Packet data sent in a BLUETOOTH format is scrambled through a linear feedback shift register based on the BLUETOOTH clock to reduce DC bias and improve security of the information in the data packets.

Several modes are described in the BLUETOOTH system specification. The communication traffic mode is the normal operational mode for communication between the master and slave devices that are joined or connected in the network. Modes for inquiry, inquiry scan, and inquiry response are used in a who-is-there protocol for identifying BLUETOOTH devices that are within signal range. In the inquiry mode an inquiry is broadcast on frequency hopping channels of an inquiry sequence. A recipient BLUETOOTH device is induced by the inquiry to respond with an inquiry response having the address of the recipient device and the recipient device clock time on frequency hopping channels based upon the frequency channel of the inquiry. Inquiry scan is a mode for listening for an inquiry from a BLUETOOTH device on frequency hopping inquiry listen channels in an inquiry scan sequence.

Modes for page, page scan, page response, master page frequency hop synchronization (FHS), and slave page FHS response are used for synchronizing and connecting the devices. A page from a master device starts a paging handshake by transmitting an address identification of a device being paged on frequency hopping page transmit channels of a paging sequence. Page scan is a mode for listening on frequency hopping page listen channels of a page scan sequence for a page having the listener's address identification. Page response is a mode for responding to the page on page response channels based upon the page transmit channels. Master page FHS is a mode for responding to the page response by transmitting an FHS signal on the next frequency hopping channel in the paging sequence. Slave page FHS response is a mode for connecting to the network by responding to the master page FHS response.

Figure 2A:
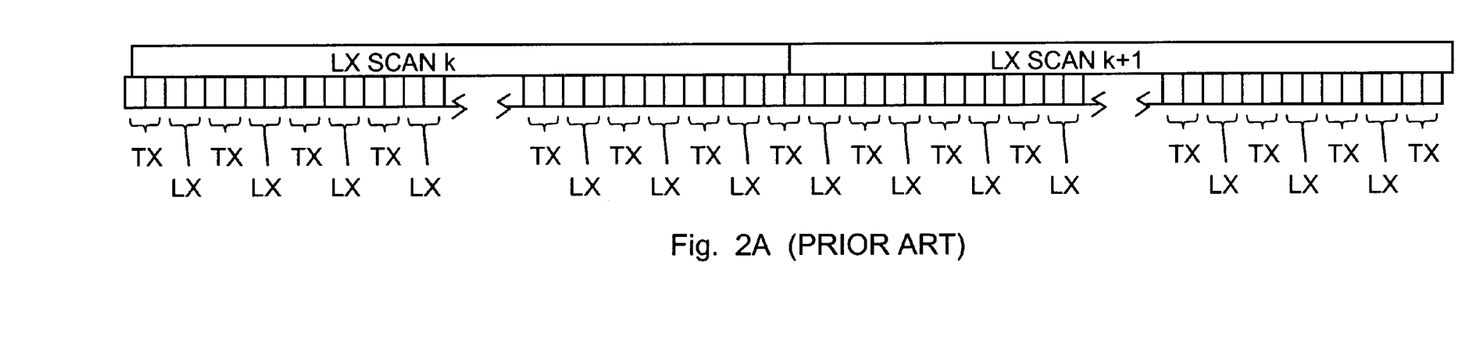
FIG. 2A is a time chart of page and page scan or inquiry and inquiry scan modes in a BLUETOOTH network of the prior art.

FIG. 2A shows a time line of the operation of the master and slave devices during page and inquiry modes. In order to page a slave device, the master device alternately transmits (TX) pages on two successive frequency channels and then listens (LX) on two successive frequency channels for page responses. The page time period for each channel is 312.5 microseconds or one-half the normal time slot period of 625 microseconds. The slave device in page scan mode listens for the pages on successive page listen channels (LX scan k and LX scan k+1) of a page scan sequence with a time period of 1.28 seconds for each channel until a page is recognized.

Figure 2B:
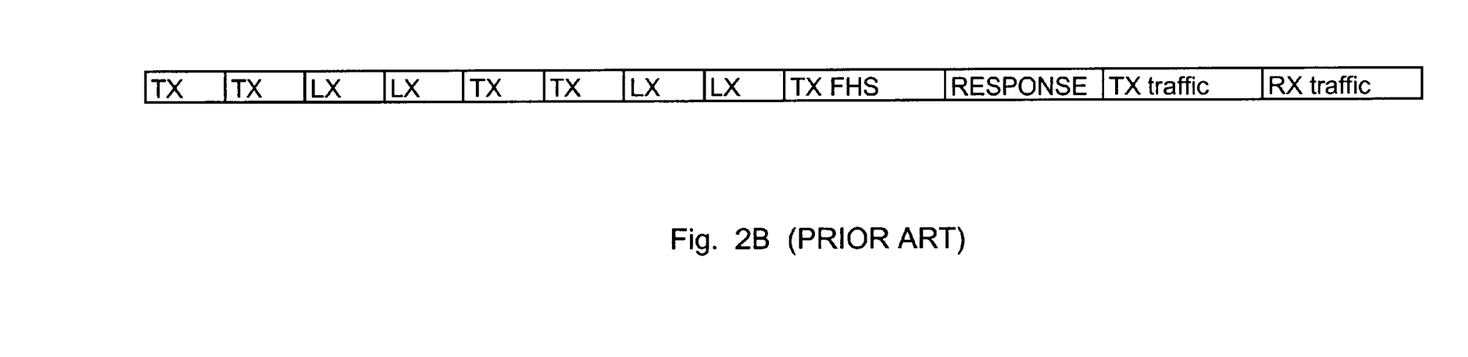
FIG. 2B is a time chart of page and page response communications in a BLUETOOTH master device of the prior art.

FIG. 2B shows a time line of the paging sequence for the master device when the paged slave device responds to the page. The master device transmits (TX) pages in successive page transmit channels and listens (LX) for a page response in a paging sequence. When the page response is received, the master device responds by transmitting an FHS packet (TX FHS) containing both the address of the master device and the 26 most significant bits (MSB)s of the 28 bits of the system clock time on the next channel of the paging sequence. The slave device then resolves the 2 least significant bits (LSB)s of the master time clock from the time-of-arrival of the FHS packet. The slave device now has all the information it needs for determining the channels and timing of the frequency hopping sequence and participating in communication traffic. At this point, the slave device joins the network by responding to the FHS packet.

An inquiry is similar to a page in that an inquiring device transmits inquiries on successive frequency channels in an inquiry sequence and then listens on corresponding frequency channels for inquiry responses with time periods for each channel of 312.5 microseconds. A device in inquiry scan mode listens for the inquiries on successive channels of an inquiry scan sequence with a time period of 1.28 seconds for each channel until an inquiry is recognized. When the device in inquiry scan mode recognizes the inquiry it responds by transmitting an FHS packet having its address and the 26 MSB bits of the 28 bits of its own clock time. However, a major distinction between a page and an inquiry is that the time-of-transmission of the master page FHS packet for a page is based upon the system clock time whereas the time-of-transmission of the FHS packet for an inquiry is based upon the local clock time of the inquiring device. As a result of this distinction, existing BLUETOOTH devices use paging but not inquiry for determining the system clock time for synchronizing to the network. A second major distinction is that a page is always initiated by a master device whereas an inquiry may be initiated by any BLUETOOTH device having inquiry capability. A third major distinction is that the FHS packet for a page carries coarse system clock time whereas the FHS packet for an inquiry carries coarse clock time for whatever device responds to the inquiry.

A more complete description of the BLUETOOTH system is available in the specification volume 1, "Specification of the Bluetooth System—Core" v1.0 B published Dec. 1, 1999, and the specification volume 2, "Specification of the Bluetooth System—Profiles" v1.0 B published Dec. 1, 1999, both under document no. 1.C.47/1.0 B. The volume 1 core specification specifies the radio, baseband, link manager, service discovery protocol, transport layer, and interoperability with different communications protocols. The volume 2 profiles specification specifies the protocols and procedures required for different types of BLUETOOTH applications. Both volumes are available on-line at www.bluetooth.com or through the offices of Telefonaktiebolaget LM Ericsson of Sweden, International Business Machines Corporation, Intel Corporation of the United States of America, Nokia Corporation of Finland, and Toshiba of Japan.

In order to synchronize to BLUETOOTH communication traffic packets for measurement and analysis purposes it would be relatively straightforward for an analyzer to use the paging process to join the piconet as a test slave device. However, this approach has several disadvantages. First, by joining the piconet the analyzer changes the piconet. A question can then arise as to whether the communication traffic pattern on the piconet was affected by the presence of the analyzer. Second, the analyzer would necessarily use one of the active slave positions in the piconet. Where all of the up seven slave positions were being used, the connection of the analyzer would prevent one of the slaves from being connected. This might be inconvenient and it would certainly change the network being tested. Worse still, in a private network having only a single master and single operational slave, the analyzer would replace either the master or the single active slave, thereby making it impossible to observe actual communication traffic between the master and the slave device.

In general, it is desirable that a protocol analyzer monitor message traffic for measurement and analysis on a link without joining or interfering with the operation of the link. With regard to a BLUETOOTH network, this means that a protocol analyzer should be able to follow all the traffic in a piconet without replacing the master or any of the operational slaves, or participating in the piconet in any way as either a master of a slave device. However, in order to monitor traffic on a BLUETOOTH link, a protocol analyzer needs to know the system clock time for the piconet. Unfortunately, the BLUETOOTH system protocol specification does not make any provision for acquiring this clock time except by joining and participating in the piconet. Therefore, there is a need for system that goes beyond the BLUETOOTH specification for non-intrusive test and measurement of a BLUETOOTH link.

SUMMARY OF THE INVENTION

It is therefore an object of the present invention to provide an apparatus and a method using an unconnected page and a later instance of communication traffic for synchronizing to a channel hopping sequence of a communication network without joining the network. This and other objects of the present invention will no doubt become obvious to those of ordinary skill in the art after having read the following summary and detailed description and viewing the figures illustrating the preferred embodiments.

Briefly, in a preferred embodiment, the present invention is a method and apparatus for synchronizing with communication traffic during time slots on channels in a channel hopping sequence on a network connecting a master device and slave devices. The timing and sequence of the channels of the communication traffic are synchronized to a system clock time that is maintained by the master device. The apparatus or analyzer of the present invention synchronizes to the communication traffic by obtaining a preliminary or unconnected system clock time from a master page frequency hop synchronization (FHS) packet from the master device when the master and slave devices are not connected by pretending to be an unconnected slave device and simulating or mimicking up to the point of connection the paging protocol for a legitimate slave device. Then, after a connection is formed between the master device and a legitimate slave device, the apparatus of the present invention updates the unconnected system clock time to a connected system clock time with a time-of-arrival of a communication traffic packet from the master device to the slave device.

In a method of a preferred embodiment of the present invention the master device is instructed to page the apparatus of the present invention. The apparatus and the master device-handshake and then the master device transmits a master page FHS packet having the system clock time. The system clock time in the master page FHS is treated by the apparatus as a preliminary system clock time. The apparatus does not respond to the master page FHS, thereby avoiding the formation of a network connection. The apparatus uses the preliminary system clock time for stepping through the channel hopping sequence in channel steps of a channel advance number while listening for communication traffic on the network. For each channel step the apparatus tunes for a scan window time period having a duration of a number of time slots, termed a time slot scan number. Then, the master device is instructed to page a slave device. The slave device connects with the master device by handshaking and then responding to the master page FHS. The master and slave devices are now in a condition for exchanging communication traffic. When the apparatus receives an instance of communication traffic packet on one of the channel steps, it uses the time-of-arrival of the packet for correcting or updating the preliminary system clock time for synchronizing to the system clock time maintained by the master device. The channel advance number and the time slot scan number are at least two and may be much greater depending upon and increasing with an allowance for clock time drift between the preliminary system clock time maintained in the apparatus and the real system clock time maintained by the master device. Preferably, the channel advance number and the time slot scan number are the same and are a number that is two to an integer power.

Although the preferred embodiments are described in terms of a BLUETOOTH system network, the present invention is applicable to other system networks using distinguishable channels in channel hopping sequences. The distinguishable channels may be implemented with frequencies, codes, time allocations, polarities, or any other distinguishing features alone or in combination.

DETAILED DESCRIPTION OF THE PREFERRED EMBODIMENTS

Figure 3:
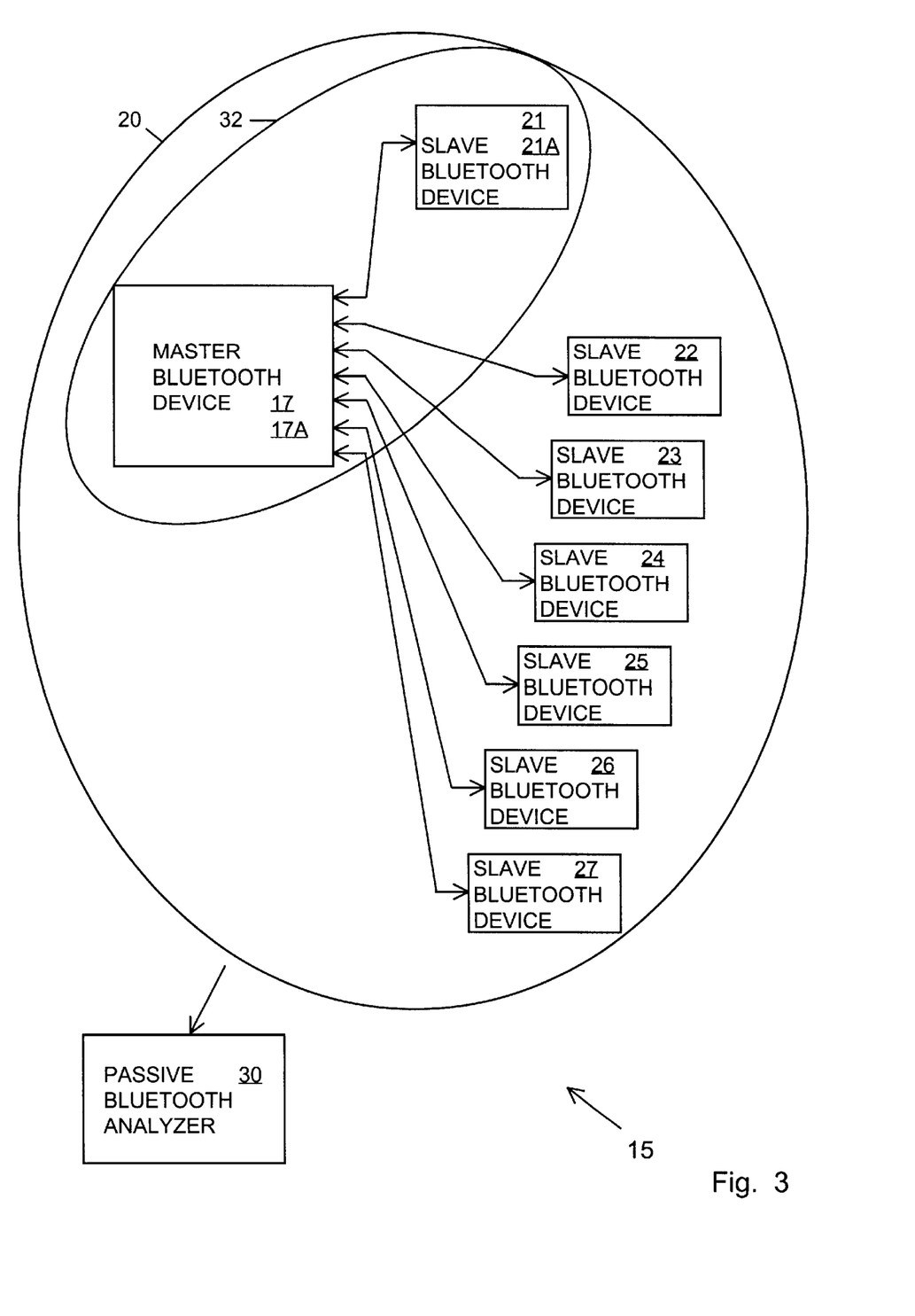
FIG. 3 is a block diagram of a system including a passive analyzer of the present invention.

FIG. 3 is a diagram of a system of the present invention referred to by the general reference number 15. The system 15 includes a BLUETOOTH master device 17 connected in a piconet network 20 to up to seven BLUETOOTH slave devices 21–27. The master device 17 and the slave devices 21–27 communicate during time slots on frequency channels in a channel hopping sequence as described above. An analyzer 30 of the present invention observes communication traffic signals between the master device 17 and the slave devices 21–27 in the network 20 but does not transmit communication traffic signals and the master device 17 and the slave devices 21–27 are not aware that the analyzer 30 receives the communication traffic signals.

In a special case, a version of the master device 17 termed a private master device 17A and a version of the slave device 21 termed a private slave device 21A connect point-to-point in a private network 32. Other slave devices 22–27 may be present within signal range of the private master device 17 but are not active in the network 32. The private master device 17A and the private slave device 21A in the private network 32 are usually manufactured in pairs or sets, for example a phone-handset combination for a telephone might be implemented using two private BLUETOOTH devices that are designed to communicate only with each other. Private BLUETOOTH devices are somewhat less expensive to manufacture than non-private BLUETOOTH devices because only a limited subset of the BLUETOOTH protocol needs to be implemented. For example, a private BLUETOOTH device may have the following limitations. The private device may not be capable of performing an inquiry. The private device may not respond to inquiries. When operating as a private device, the master device 17A may support paging only to a pre-defined single slave 21A or set of slaves having an address or addresses known in the BLUETOOTH specification as a static BLUETOOTH address or addresses. The private slave device 21A may support forming connections with only one master device 17A or a restricted set of master devices. These restrictions can provide an additional level of security. However, the limitations in the protocol can make passive measurement and analysis of their communication traffic difficult.

For the discussion below unless it is specifically mentioned, the discussion of the piconet network 20 also applies to the private network 32 as a subset.

A paging handshake algorithm is specified in the BLUETOOTH system specification for connecting the master device 17 and the slave devices 21–27 in the network 20. A connected page is a page by the master device 17 where the master device 17 is already currently connected to at least one of the slave devices 21–27. An unconnected page is a page by the master device 17 for establishing the network 20 where the master device 17 is not currently connected to any of the slave devices 21–27.

When the master device 17 supports connected pages, it is typically straightforward for the analyzer 30 to synchronize to the network 20 by pretending to be a slave device and receiving a master page FHS packet having coarse system clock time data bits. The analyzer 30 derives the precise system clock time from the coarse system clock time data bits and the time-of arrival of the FHS packet. According to the BLUETOOTH specification, the master device 17 expects a response to the master page FHS packet in order to make a connection. The BLUETOOTH slave devices 21–27 join the network 20 by providing this response. In order to avoid the connection joining the network 20, the analyzer 30 does not respond to the master page FHS packet. Eventually, the master device 17 times out and ignores the analyzer 30. At this point the analyzer 30 uses the system clock time for synchronizing to the channels in the channel hopping sequence for observing the communication traffic on the network 20. However, not all implementations of the master device 17 support connected pages. In particular, the private master device 17A typically does not support connected pages and may also be limited to paging a pre-defined address identification of the private slave device 21A.

Figure 4:
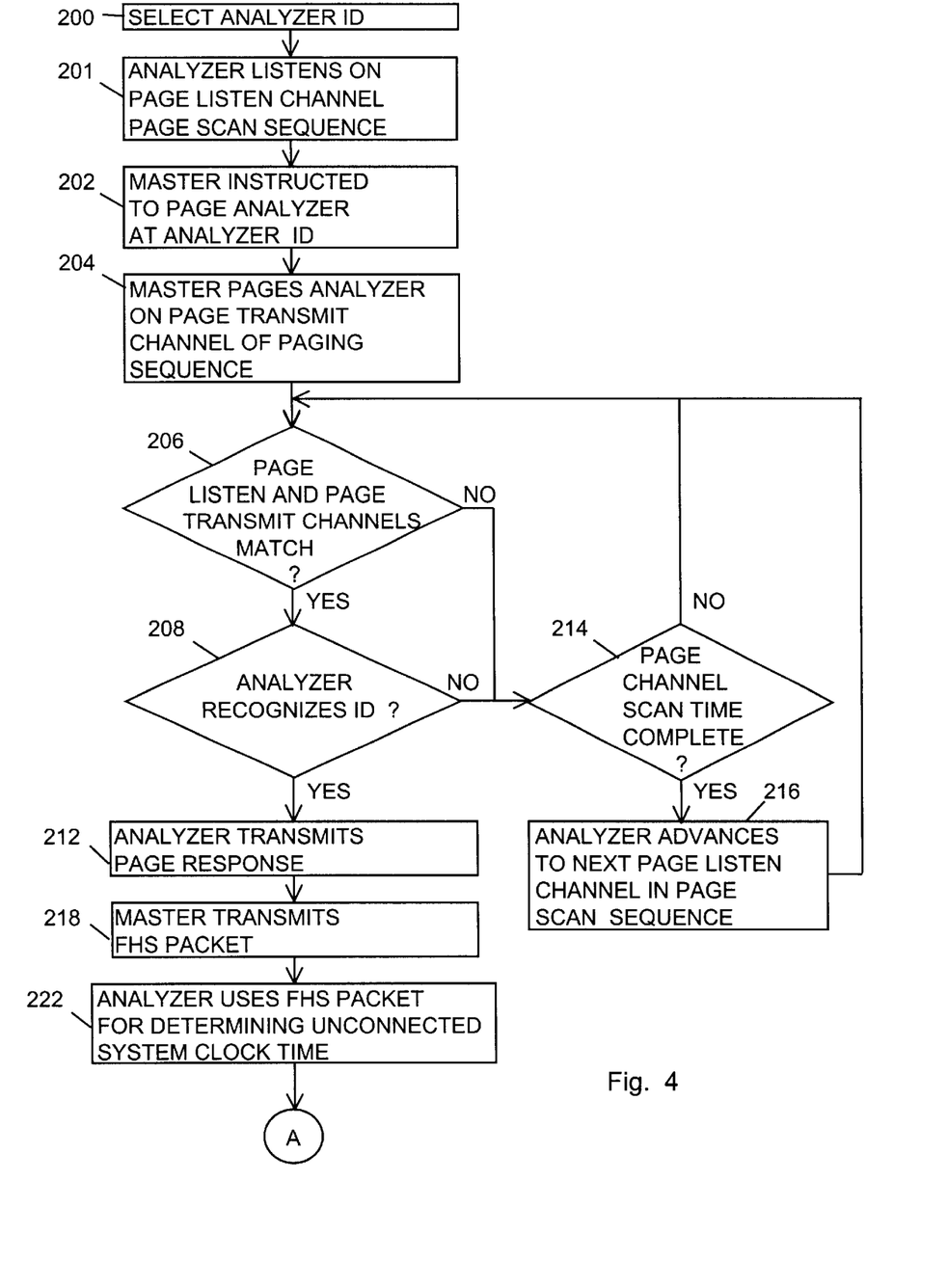
FIGS. 4 and 5 are parts one and two, respectively, of a flow chart of an unconnected page synchronization method of the present invention in the analyzer of FIG. 3 for synchronizing to a network having communication traffic on channels during time slots in a channel hopping sequence without joining the network.

FIG. 4 is part one of a flow chart of an unconnected page based method for synchronization to the network 20 without joining the network 20. In a step 200 a 48 bit IEEE type address identification for the analyzer 30 is entered into the analyzer 30. The actual address identification is arbitrary but it should not be an address assigned to any other BLUETOOTH device range signal range unless the master device 17 is only capable of paging certain addresses, for example in the private network 32 having the master device 17A and the slave device 21A. In that case the analyzer 30 should use the address identification of the slave device 21–27 and the slave device 21–27 should be prevented from responding to paging attempts by the master device 17. This can be accomplished by removing the slave device 21–27 from signal range or turning it off. In a step 201, the user instructs the analyzer 30 to enter a page scan mode. In this mode the analyzer 30 listens for a relatively long period of time (up to 1.28 seconds) on a single page listen channel for a 68 bit device ID packet having the address identification of the analyzer 30. Every 1.28 seconds the frequency channel on which the analyzer 30 listens for its device ID packet changes according to a page scan sequence.

In a step 202 the user enters the address identification being used by the analyzer 30 into the master device 17 and instructs the master device 17 to page the analyzer 30 with a page signal. The page signal is a packet of 68-bits having the address identification of the analyzer 30. Paging is started when in an event 204 the master device 17 transmits a page to the analyzer 30 on a page transmit channel of a paging sequence. As described above, the master device 17 transmits pages on two successive frequency channels in a paging sequence and then listens on two successive frequency channels for page responses. The page time period for each channel is 312.5 microseconds or one-half the normal time slot period of 625 microseconds. In a step 206 when the analyzer 30 recognizes a page on its page listen channel it checks in a step 208 for its address identification. In a step 212 when the analyzer 30 recognizes its address identification, it transmits a page response. The page response packet echoes the page packet of 68-bits having the address identification of the analyzer 30.

When the analyzer 30 does not recognize its address identification on its page listen channel, then in a step 214 the analyzer 30,determines whether it has completed the page scan time for the current page listen channel. When the page scan time has not completed, the analyzer 30 continues listening for a page having its address identification in the steps 206 and 208. In a step 216, when the page scan time has completed, the analyzer 30 advances to the next page listen channel in the page scan sequence and then listens in the steps 206 and 208 for the page having its address identification at the new page listen channel, and so on.

In an event 218, when the master device 17 recognizes the page response from the analyzer 30, it transmits a master page FHS packet having an address identification of the master device 17 and a coarse system clock time to the analyzer 30. The coarse system clock time is the 26 most significant bits (MSB)s of a 28 bit system clock time. In a step 222 the analyzer 30 uses the coarse time data bits and the time-of-arrival of the FHS packet for determining an unconnected or preliminary system clock time. Importantly, the analyzer 30 does not respond to the FHS packet from the master device 17 and the master device 17 times out.

Figure 5:
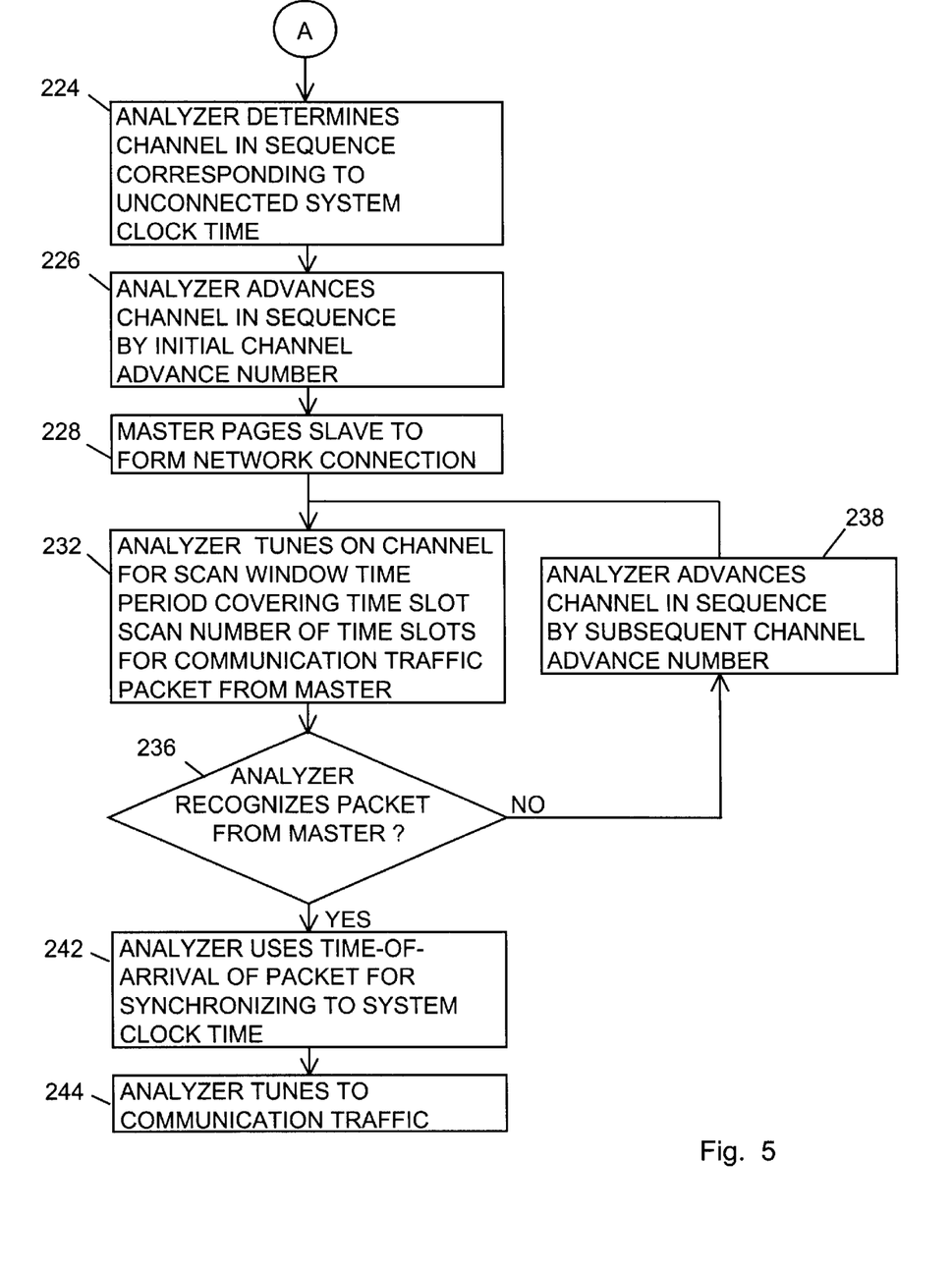

FIG. 5 is part two of a flow chart of an unconnected page based method for synchronization. In a step 224, the analyzer 30 uses the preliminary system clock time and the master address for computing a channel corresponding to a phase in the pseudo-random channel hopping sequence of the network 20. In a step 226, the analyzer 30 advances the phase or channel of the sequence by an initial number of channels, termed an initial channel advance number. As described below in the detailed description accompanying FIG. 6, a preferred initial channel advance number depends upon and increases with an allowance for clock time drift error between the system clock time in the master device 17 and a local clock time in the analyzer 30. Typically, the allowance for clock time drift error can be estimated as a product of the difference in clock rates of the local and master clock times and the expected length of time between the reception of the preliminary or unconnected system clock time and the reception, after the network 20 is connected, of an instance of communication traffic from the master device 17.

In a step 228 the user enters the address identification of at least one of the slave devices 21–27 into the master device 17 and instructs the master device 17 to page the slave device 21–27. The master device 17 and the slave device 21–27 process the paging messages in a conventional manner for connecting and thereby forming the network 20. When the network 20 is formed, the master device 17 and the slave device 21–27 can begin exchanging communication traffic packets. It should be noted that the slave device 21–27 responds almost immediately to the master page FHS packet and that communication traffic packets follow almost immediately thereafter. Therefore, the slave device 21–27 sees minimal clock time drift error and has no need to use the relatively more complex synchronization method described herein for the analyzer 30. Unfortunately, because the paging handshake between the master device 17 and the slave device 21 requires knowledge of the unconnected slave clock time, the analyzer 30 itself cannot easily or directly observe the master page FHS packet transmitted to the slave device 21 for acquiring the system clock time.

Figure 6:
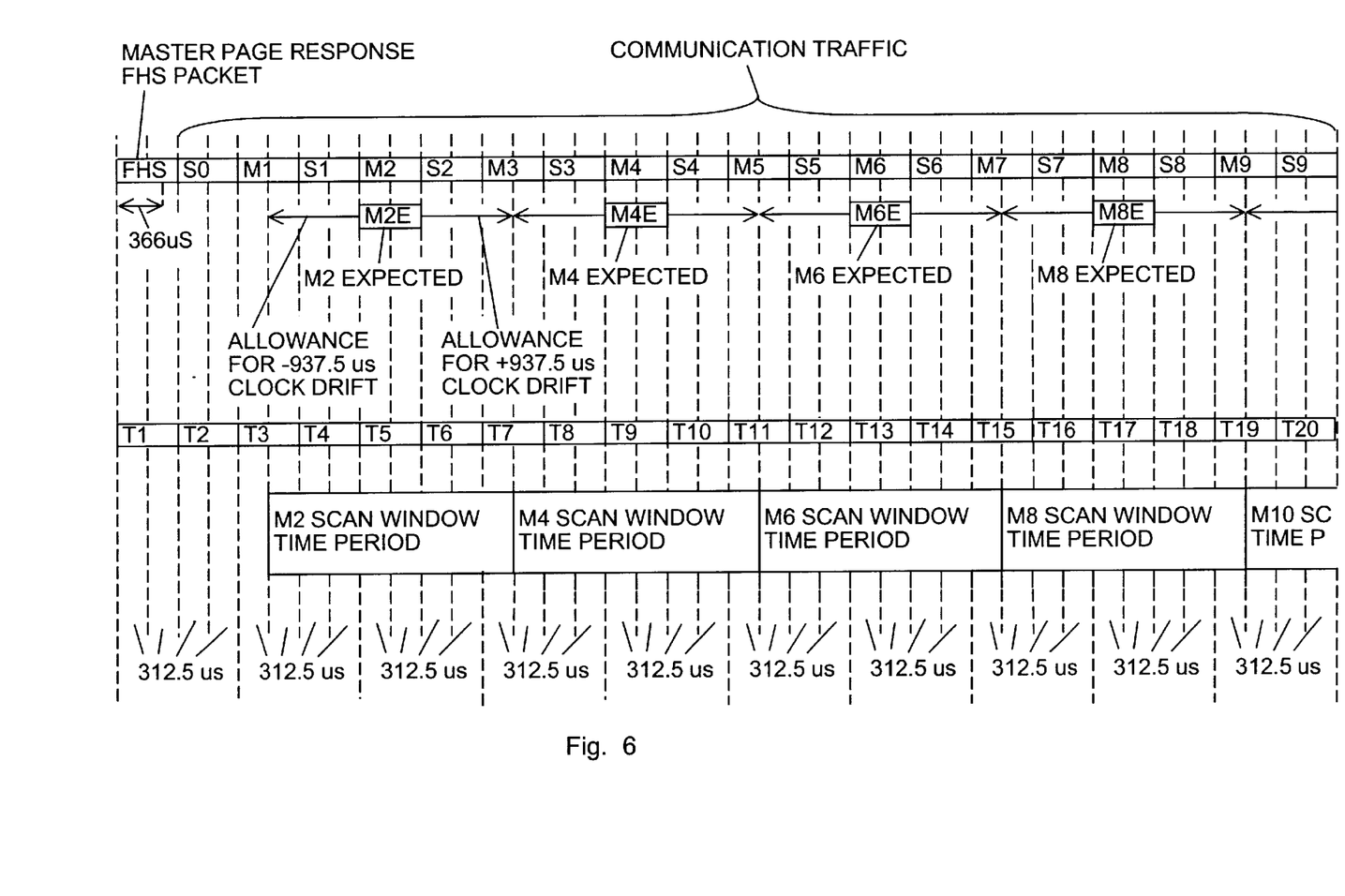
FIG. 6 is a time chart showing scan window time periods for the method of FIGS. 4–5.
Figure 7:
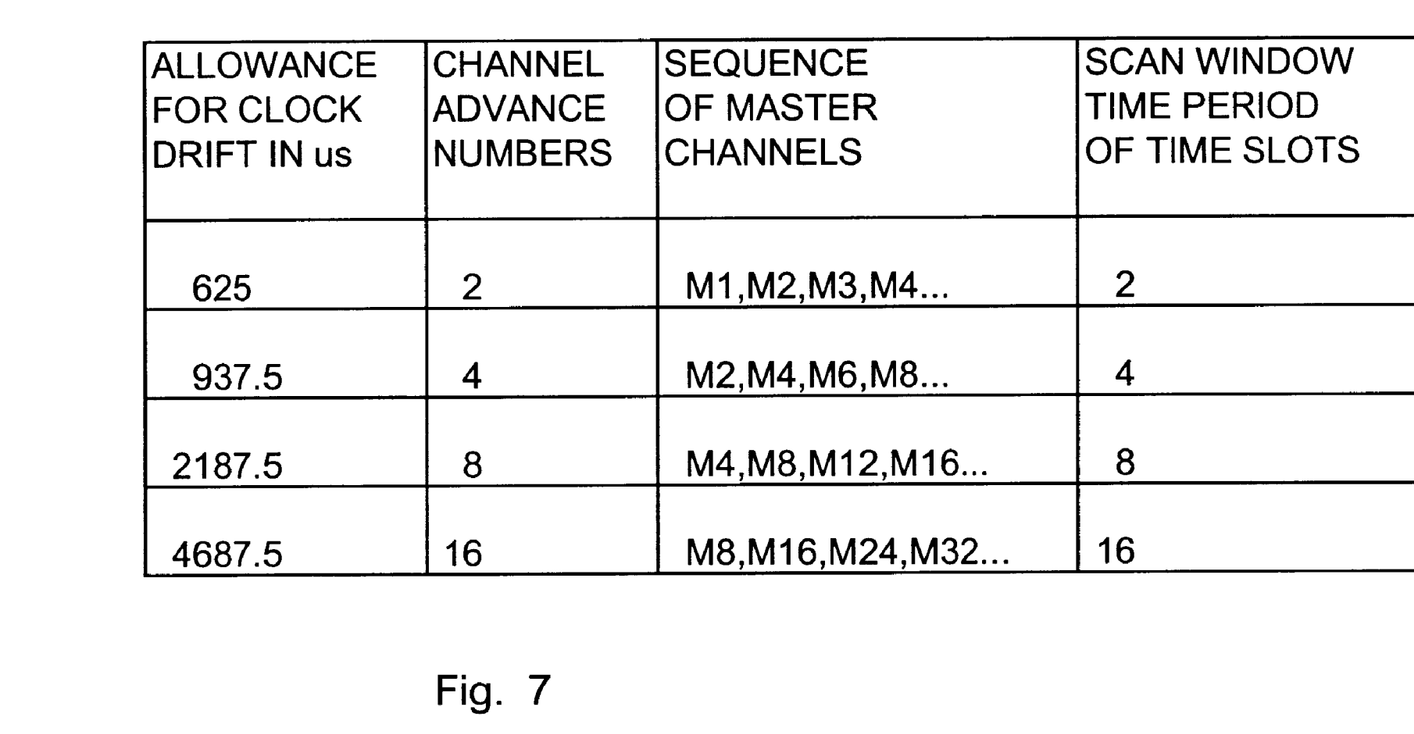
FIG. 7 is a table of channel advance and scan window time slot numbers for the method of FIGS. 4–5.

For the analyzer 30 there may be a relatively long time delay, for example minutes, for the user to change the address identification in the master device 17 from the analyzer 30 to the slave device 21 and to enable the slave device 21 for receiving a page from the master device 17. The analyzer 30 uses the page synchronization method described herein in order to tolerate and make allowance for the clock time drift error that may occur due to this time delay. In a step 232 the analyzer 30 tunes to its current channel for a scan window time period. As illustrated in FIGS. 6 and 7 and described in the accompanying detailed description below, the scan window time period is the time period of a time slot multiplied by a selected time slot scan number. The size of a preferred time slot scan number depends upon and increases with the allowance for clock time drift error between the system clock time in the master device 17 and a local clock time in the analyzer 30.

The analyzer 30 listens for communication traffic from the master device 17 in a step 236. In a step 238, when the scan window time period elapses before the analyzer 30 recognizes an instance of communication traffic, the analyzer 30 advances the channel of the channel hopping sequence by a number of channels termed a subsequent channel advance number. It will be noted that the user may take some time for instructing the master device 17 in the step 228 and there may be many iterations of the steps 236 and 238 before the master device 17 and one of the slave devices 21–27 are connected and exchanging communication traffic packets. As illustrated in the FIGS. 6 and 7 and described in the accompanying detailed descriptions below, a preferred subsequent channel advance number depends upon and increases with an allowance for the clock time drift between the analyzer 30 and the master device 17. Preferably, the time slot scan number and the initial and subsequent channel advance numbers are the same number. However, a limitation of larger channel advance numbers is that there is a proportionally larger chance that communication traffic is missed because fewer master channels are observed.

When a communication traffic packet from the master device 17 is recognized, in a step 242 the analyzer 30 uses the time-of-arrival of the packet for refining the preliminary system clock time for synchronizing to the system clock time. Then, in a step 244 the analyzer 30 sequentially tunes to the channels in the channel hopping sequence for receiving and observing the two-way communication traffic communication traffic between the master device 17 and the slave devices 21–27 on the network 20.

FIG. 6 is a time chart showing the scan window time periods for the timing of the unconnected system clock time with respect to the actual system clock time. The FHS packet received before the network 20 is connected is 366 microseconds long. The communication traffic boxes show potential channels for the communication traffic between the master device 17 and the slave devices 21–27 versus time following the FHS packet. The horizontal time scale shows time in 312.5 microsecond increments. S0 represents the slave time slot or channel in the channel hopping sequence immediately following the master page FHS packet. M1 represents the first master time slot or channel in the channel hopping sequence in which the master device 17 can transmit after transmitting the master page FHS packet. S1 represents the slave time slot or channel in the channel hopping sequence in which the one of the slave devices 21–27 addressed by the master device 17 in the M1 time slot can respond to the M1 transmission. M2 represents the second master time slot or channel in the channel hopping sequence in which the master device 17 can transmit after transmitting the master page FHS packet. S2 represents the slave time slot or channel in the channel hopping sequence in which the one of the slave devices 21–27 addressed by the master device 17 in the M2 time slot can respond to the M2 transmission, and so on.

The boxes for T1–20 represent the time periods of the first twenty sequential full time slots (625 microseconds) after the time-of-arrival of the start of the master page FHS packet. The boxes M2E, M4E, M6E and M8E represent the times that the master communication traffic packet transmissions can be expected for the M2, M4, M6 and M8 channels, respectively. For example, the analyzer 30 can expect to hear any master communication traffic on the master M2 channel during the fifth time slot T5 (between 2500 and 3125 microseconds) after the start of the master page FHS packet. In an exemplary case for a clock time drift allowance of ±937.5 microseconds, the analyzer 30 extends the times of the expected master communication traffic packets M2E, M4E, M6E, and M8E by ±937.5 microseconds for an M2 scan window time period, an M4 scan window time period, an M6 scan window time period, and an M8 scan window time period, respectively. Of course, the user is unlikely to instruct the master device 17 so quickly that any communication traffic is seen the first time the analyzer 30 applies the scan windows. However, the analyzer 30 continues to scan through the frequency hopping sequence by the advance channel number and to repeat the sequence for scan window time periods. In the case of an allowance of ±937.5 microseconds, in a preferred embodiment the analyzer 30 tunes to the master M2 channel beginning at two and one-half time slots (middle of the third time slot T3) after the time-of-arrival of the master page FHS packet for a time period equivalent to four time slots (2500 microseconds) until six and one-half times slots (middle of the seventh time slot T7) after the time-of-arrival of the master page FHS packet, then tunes to the master M4 channel for a time period equivalent to four time slots, then tunes to the master M6 channel for a time period equivalent to four time slots, and so on.

FIG. 7 is a table relating the allowance for clock time drift in microseconds to the channel advance numbers (assuming the initial and subsequent advance numbers are the same), the sequence of master advance channels, and the scan window time period in time slots. The first in the sequence of master channels is one-half the initial channel advance number and the increments in the sequence are one-half the subsequent channel advance number. In a first example, if a clock time drift allowance of 937.5 microseconds is required, then a preferred channel advance number of four and a preferred scan window time period of four time slots (the time slot scan number of four) are selected. The sequence of master channels is M2, M4, M6, M8 and so on in increments of two counting from the master page FHS packet considered to be master channel 0. The scan window time period of four time slots includes 2 master time slots and 2 slave time slots. The channel advance number and the time slot scan number are preferably the same and a number that is two to an integer power. Other numbers can be used. However, the use of the same numbers and the numbers of two to the integer power is preferable because it ensures that no time gaps occur between scan window time periods. In a second example, for a time drift allowance of 625 microseconds, then a preferred channel advance number of two and a preferred scan window time period of two time slots (the time slot scan number of two) are selected.

The table of FIG. 7 can be extended indefinitely for a greater clock time drift allowance requirement by dividing the required allowance by the time period of the time slot (625 microseconds), adding one-half, multiplying the sum by two, and then rounding up to two to an integer power. For example, assume that a clock time drift allowance of 4687.5 microseconds is required. Dividing 4687.5 by 625 yields 7.5. Adding ½ yields 8. Multiplying by two yields 16. Because 16 is power of two ($2^4$), the time slot scan number of 16 can be used. Similarly, for a clock time drift allowance of one-tenth second, the calculation of 2*(100,000/625+0.5) yields a number of 321. The number 321 is rounded up to the next higher number that is a power of two which is 512 ($2^9$). Therefore, for an allowance for clock time drift of one-tenth second, the channel advance number and the time slot scan number are five-hundred twelve.

Figure 8:
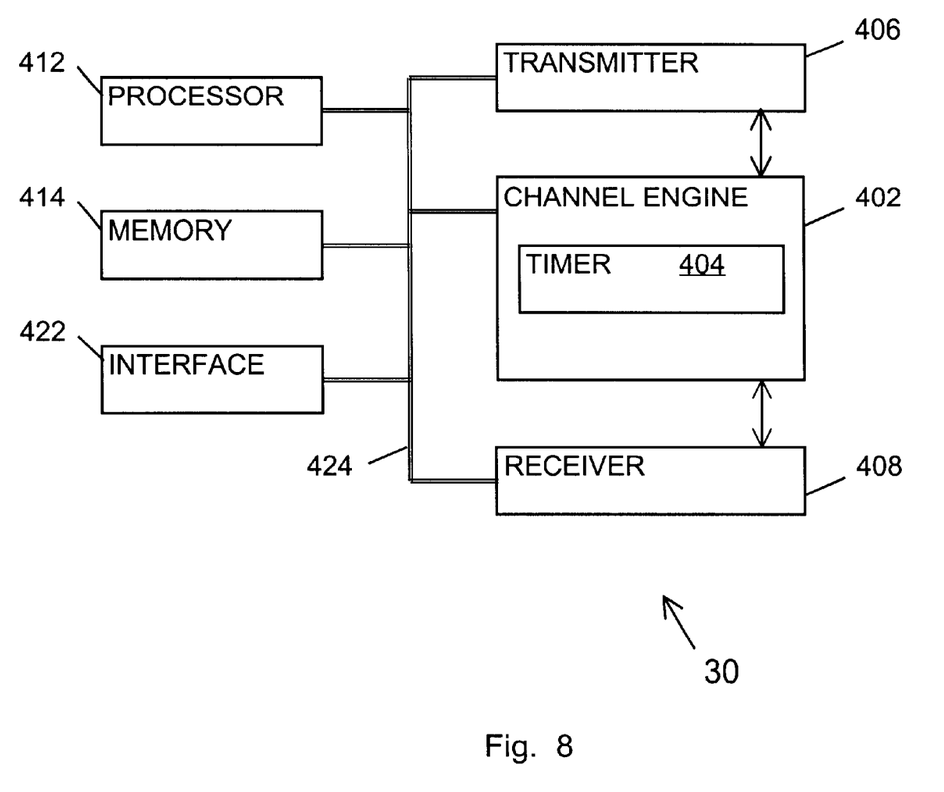
FIG.8 is a block diagram of the analyzer of FIG. 3 for implementing the method of FIGS. 4–5.

FIG. 8 is a block diagram of the analyzer of the present invention referred to by the reference number 30. The analyzer 30 includes a channel engine 402 including a hop sequence generator and a timer 404; a transmitter 406, and a receiver 408. The timer 404 includes an oscillator, preferably using a crystal as a resonant element, as a time base for providing a local clock time. In an unsynchronized condition the local clock time has a clock rate that is nominally the same as the clock rate of the system clock time. The channel engine 402 provides information to the timer 404 for setting the local clock time according to information for the unconnected system clock time and then correcting or updating the local clock time to the exact system clock time. The channel engine 402 provides timing adjustment information to the timer 404 and then uses the local clock time provided by the timer 404, operational modes, and address identifications for determining the timing and channels for the channel hopping sequences as described above. Then, once the system clock time has been acquired from the master device 17, the timer 404 continues to use information for the times-of-arrival of the communication traffic packets for providing a local clock time that tracks the system clock time. The transmitter 406 transmits page response signals according to the channels and times from the channel engine 402. The receiver 408 uses the channels and times from the channel engine 402 for receiving communication traffic, page, and master page FHS signals.

The analyzer 30 also includes a processor 412, a memory 414, an interface 422, and a signal bus 424. The processor 412 operates in a conventional manner over the signal bus 424 for using program codes in the memory 414 for coordinating the activities of the above described elements of the analyzer 30. The interface 422 connects the analyzer 30 to external equipment for automatic operation of the analyzer 30 and passing data for the packets, measurements, and analysis from the analyzer 30 to the external equipment. A user entry device in the external equipment enables a human user to set the mode in the analyzer 30 and to setup measurements and analysis on the communication traffic packets. A display on the external equipment enables a human user to view the status of the analyzer 30 and observe the communication traffic packets and results of the measurements and analysis. In a preferred embodiment, the channel engine 402 is implemented in a hardware state machine. However, those of ordinary skill in the field of hardware and software engineering will recognize that the channel engine 402 can be implemented in many ways including as a software state machine and as multi-tasking software.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method of synchronizing to communication traffic between a master device and a slave device in a network on channels during time slots in a channel hopping sequence derived from a system clock time, comprising steps of:

receiving a synchronization signal having an unconnected system clock time from said master device while said master device and said slave device are not connected;

stepping through said sequence to certain ones of said channels according to said unconnected system clock time until an instance of communication traffic is recognized;

connecting said master device to said slave device for transmitting said communication traffic;

updating said unconnected system clock time according to a time-of-arrival of said instance of said communication traffic for providing a connected system clock time; and synchronizing to said channels in said sequence according to said connected system clock time for observing subsequent instances of said communication traffic.

2. The method of claim 1, wherein:

the step of stepping through said sequence includes a step of sequentially tuning to said certain channels beginning at an initial channel derived from said unconnected system clock time and progressing to new ones of said certain channels computed by advancing last ones of said certain channels by a selected subsequent channel advance number of at least two in said sequence until said instance of said communication traffic is recognized.

3. The method of claim 2, further comprising a step of:

computing said initial channel by advancing said sequence from a one of said channels indicated by said unconnected system clock time by an initial channel advance number of at least two.

4. The method of claim 2, wherein:

the step of stepping through said sequence includes a step of sequentially tuning to each of said certain channels for a scan window time period of a selected time slot scan number of at least two time periods of said time slots.

5. The method of claim 4, wherein:

said subsequent channel advance number and said time slot scan number are the same number.

6. The method of claim 4, further comprising steps of:

setting a local clock time according to said unconnected system clock time; and selecting said time slot scan number according to an allowance for clock time drift of said local clock time with respect to said system clock time occurring between receiving said synchronization signal and recognizing said instance of said communication traffic.

7. The method of claim 4, wherein:

said time slot scan number is at least two times a sum of one-half and a dividend of said allowance divided by the time period of said time slot.

8. The method of claim 7, wherein:

said time slot scan number is two to an integer power.

9. The method of claim 1, wherein:

the step of receiving said synchronization signal includes steps of:

instructing said master device to page an apparatus by transmitting a page on page transmit channels of a paging sequence to said apparatus;

simulating said slave device in said apparatus by listening on page listen channels in a page scan sequence until said page is recognized, transmitting a page response for responding to said page, and receiving said synchronization signal in response to said page response; and allowing said master device to time out while awaiting a response to said synchronization signal.

10. The method of claim 9, wherein:

said master device operates according to a BLUETOOTH specification; and said slave device operates according to said BLUETOOTH specification.

11. An apparatus for synchronizing to communication traffic between a master device and at least one slave device on channels during time slots in a channel hopping sequence derived from a system clock time, comprising:

a receiver for receiving a synchronization signal having an unconnected system clock time from said master device while said master device and said slave device are not connected, tuning to certain ones of said channels until an instance of said communication traffic is received after said master device and said slave device have been connected, and then tuning to said channels for observing subsequent instances of said communication traffic; and a channel engine for stepping through said sequence according to said unconnected system clock time for deriving said certain channels, updating said unconnected system clock time according to a time-of-arrival of said is instance of said communication traffic for providing a connected system clock time, and then using said connected system clock time for deriving said channels to the receiver for tuning to said subsequent instances of said communication traffic.

12. The apparatus of claim 11, wherein:

the channel engine steps through said sequence for sequentially providing said certain channels beginning at an initial channel derived from said unconnected system clock time and progressing to new ones of said certain channels computed by advancing last ones of said certain channels by a selected subsequent channel advance number of at least two in said sequence until said instance of said communication traffic is received.

13. The apparatus of claim 12, wherein:

the channel engine computes said initial channel by advancing said sequence from a one of said channels indicated by said unconnected system clock time by an initial channel advance number of at least two.

14. The apparatus of claim 12, wherein:

the channel engine steps through said sequence for providing each of said certain channels for a scan window time period of a selected time slot scan number of at least two time periods of said time slots.

15. The apparatus of claim 14, wherein:

said subsequent channel advance number and said time slot scan number are the same number.

16. The apparatus of claim 14, further comprising:

a timer for setting a local clock time according to said unconnected system clock time; and wherein:
said time slot scan number is selected according to an allowance for clock time drift of said local clock time with respect to said system clock time occurring between receipt of said synchronization signal and receipt of said instance of said communication traffic.

17. The apparatus of claim 15, wherein:

said time slot scan number is at least two times a sum of the number one-half and a dividend of said allowance divided by the time period of said time slot.

18. The apparatus of claim 17, wherein:

said time slot scan number is two to an integer power.

19. The apparatus of claim 11, wherein:

the channel engine mimics said slave device by deriving page listen channels in a page scan sequence until a page is received on a page transmit channel from said master device after said master device is instructed to page the apparatus by transmitting said page on page transmit channels of a paging sequence as if the apparatus were capable of being said slave device, deriving a page response channel based upon said page transmit channel, and deriving a page response synchronization channel based upon said page response channel; and the receiver tunes to said page scan channels for listening for said page, receives said page on said page transmit channel, and then receives said synchronization signal on said page response synchronization channel; and further comprising:
a transmitter for transmitting a page response signal on said page response channel and then allowing said master device to time out while awaiting a response to said synchronization signal.

20. The apparatus of claim 11, wherein:

said master device operates according to a BLUETOOTH specification; and said slave device operates according to said BLUETOOTH specification.

* * * * *